US006224156B1

(12) United States Patent
Fleigle

(10) Patent No.: US 6,224,156 B1
(45) Date of Patent: May 1, 2001

(54) SEAT BACK RECLINER KIT FOR WHEELCHAIR

(75) Inventor: Donald E. Fleigle, Albertville, AL (US)

(73) Assignee: Sunrise Medical HHG Inc., Longmont, CO (US)

( * ) Notice: Subject to any disclaimer, the term of this patent is extended or adjusted under 35 U.S.C. 154(b) by 0 days.

(21) Appl. No.: 09/236,035

(22) Filed: Jan. 22, 1999

Related U.S. Application Data

(60) Provisional application No. 60/073,562, filed on Feb. 3, 1998.

(51) Int. Cl.7 ....................................................... B60N 2/02

(52) U.S. Cl. ................................ 297/354.1; 297/DIG. 4; 280/304.1; 280/43.16

(58) Field of Search ............................. 280/304.1, 250.1, 280/43.16; 297/230.14, 310, 354.1, 354.2, 354.12, 354.13, DIG. 4, 362.12

(56) References Cited

U.S. PATENT DOCUMENTS

| | | | | |
|---|---|---|---|---|
| 3,185,495 | | 5/1965 | Pivacek | 250/34 |
| 3,618,968 | | 11/1971 | Greet | 280/47.11 |
| 4,425,987 | | 1/1984 | Porter | 188/67 |
| 4,457,406 | | 7/1984 | Porter | 188/67 |
| 4,632,450 | | 12/1986 | Holdt | 297/84 |
| 4,691,962 | | 9/1987 | Holdt | 297/84 |
| 4,744,578 | | 5/1988 | Sterns | 280/242 |
| 4,968,051 | | 11/1990 | Luo | 280/304.1 |
| 4,974,905 | | 12/1990 | Davis | 297/377 |
| 5,060,962 | * | 10/1991 | McWethy | 280/304.1 |
| 5,195,803 | | 3/1993 | Quintile | 297/365 |
| 5,263,768 | * | 11/1993 | Scheulderman | 297/DIG. 4 X |
| 5,292,144 | * | 3/1994 | Sosnoff | 280/304.1 |
| 5,378,041 | * | 1/1995 | Lee | 280/304.1 X |
| 5,524,969 | * | 6/1996 | Harrison et al. | 297/354.12 |
| 5,549,357 | | 8/1996 | Counts et al. | 297/354.13 |

FOREIGN PATENT DOCUMENTS

| | | | | |
|---|---|---|---|---|
| 89 14 424 U | | 3/1990 | (DE) . | |
| 0 198 957 | | 10/1986 | (EP) . | |
| 0 404 574 | | 12/1990 | (EP) . | |
| 2141980 | * | 1/1985 | (GB) | 280/304.1 |

OTHER PUBLICATIONS

Quickie Manual Products parts Manual, Jan., 1996, pp. 1.4, 8.9, 9.16 and 9.21.

* cited by examiner

*Primary Examiner*—Laurie K. Cranmer
(74) *Attorney, Agent, or Firm*—MacMillan, Sobanski & Todd, LLC

(57) ABSTRACT

A seat back recliner kit for attachment to a wheelchair which does not have a reclining seat back. A separate recliner mechanism is attached to each side frame for the wheelchair. Each recliner mechanism includes a rear wheel mounting bracket which attaches to the side frame for providing one or more rear wheel mounting locations spaced further to the rear of the wheelchair than the original rear wheel mounting locations. The new rear wheel mounting locations provide stability when the wheelchair is occupied with the seat back reclined. A pivoting seat back support is attached to the rear of each wheelchair side frame and the wheelchair seat back is attached to the pivoting seat back supports. An adjustable length brace extends between each seat back support and a rear wheel mounting block for adjusting the seat back angle. The brace is released by operating a hand lever while the seat back angle is adjusted and is locked when the lever is released.

16 Claims, 8 Drawing Sheets

SEAT BACK RECLINER KIT FOR WHEELCHAIR

CROSS-REFERENCE TO RELATED APPLICATIONS

This application claims priority to U.S. Provisional Patent Application Serial No. 60/073,562 filed Feb. 3, 1998.

STATEMENT REGARDING FEDERALLY SPONSORED RESEARCH OR DEVELOPMENT

Not Applicable.

BACKGROUND OF THE INVENTION

The invention relates to wheelchairs and more particularly to a seat back recliner kit which may be mounted on an existing wheelchair to convert the wheelchair from a fixed angle seat back to an adjustable angle seat back.

Most wheelchairs are provided with a seat back which has a fixed angle relative to the seat bottom. Higher priced wheelchairs also are available with relining seat backs. When a person is confined to a wheelchair for mobility, a single seat back position may become uncomfortable after several hours of sitting in the same position. If the person desires to take a nap or to watch television or to do some task which does not require an upright sitting position, it may be necessary to move the person from a wheelchair having a fixed angle seat back for the person's comfort.

If a wheelchair user initially purchases a wheelchair having a fixed angle and seat back later desires to have a wheelchair with a reclining seat back, it has been necessary for the user to purchase a second wheelchair. This may involve a significant expense which is not covered by medical insurance. There has been no convenient way for converting a fixed angle seat back wheelchair to a reclining seat back wheelchair. One major difference between the two types of wheelchairs which has prevented conversion is in the location of the rear drive wheels. If the seat back is reclined, the center of gravity is moved to the rear. In a conventional non-reclining wheelchair, the rear wheel axle is located either directly below or slightly forward of the seat back support. This will locate the center of gravity of the occupied wheelchair between the front and rear wheels. If a seat back in a conventional wheelchair were modified to recline, reclining the seat back may move the center of gravity of the occupied wheelchair to a point where the wheelchair becomes unstable. Consequently, there may a risk that a conventional wheelchair fitted with a seat back recliner will tip over.

BRIEF SUMMARY OF THE INVENTION

According to the invention, a kit is provided for converting an existing wheelchair having a fixed seat back angle to a reclining seat back wheelchair. This eliminates the need and the cost to purchase a new wheelchair when a reclining seat back is desired.

A wheelchair includes a frame assembly having two spaced side frames. Cross braces may maintain a permanent spaced relationship between the side frames, or may be designed to allow the side framed collapse together to facilitate transportation of the wheelchair. At least one hole is provided on each side frame for mounting a rear wheel on each side frame. Frequently, two vertically spaced wheel mounting holes are provided on each side frame so that the wheelchair may be configured for either of two heights. The seat back recliner kit includes two wheel mounting brackets.

One wheel mounting brackets bolts to at least one existing rear wheel mounting hole on each side frame, or is otherwise secured to each side frame. The brackets provide new wheel mounting holes which are located to the rear of the existing wheel mounting holes. This sufficiently increases the wheelbase of the wheelchair to provide stability when the wheelchair is occupied with the seat back reclined.

A separate seat back mounting section is secured to a rear member on each side frame on the wheelchair. A seat back support is pivotally connected to each seat back mounting section. A conventional wheelchair seat back is secured between the two seat back supports. For each side of the wheelchair, an adjustable length brace extends between a pivot on the seat back support and the wheel mounting bracket. By changing the length of the brace, the angle of the seat back support is changed. The brace includes a releasable locking mechanism for use in adjusting and maintaining its length.

The seat back support may be provided with a handle at its upper end for pushing the wheelchair and for use when adjusting the seat back angle. Preferably, a releasable locking mechanism on the brace is connected to a releasing lever mounted on or adjacent the handle. The seat back angle is adjusted by operating the releasing levers to release the brace locks while grasping the handles, positioning the seat back to the desired angle and releasing the levers to engage the brace locks.

Accordingly, it is an object of the invention to provide a kit for attachment to wheelchair for permitting the wheelchair seat back to be reclined.

Other objects and advantages of the invention will become apparent from the following detailed description of the invention and the accompanying drawings.

DETAILED DESCRIPTION OF THE INVENTION

Figure 1:
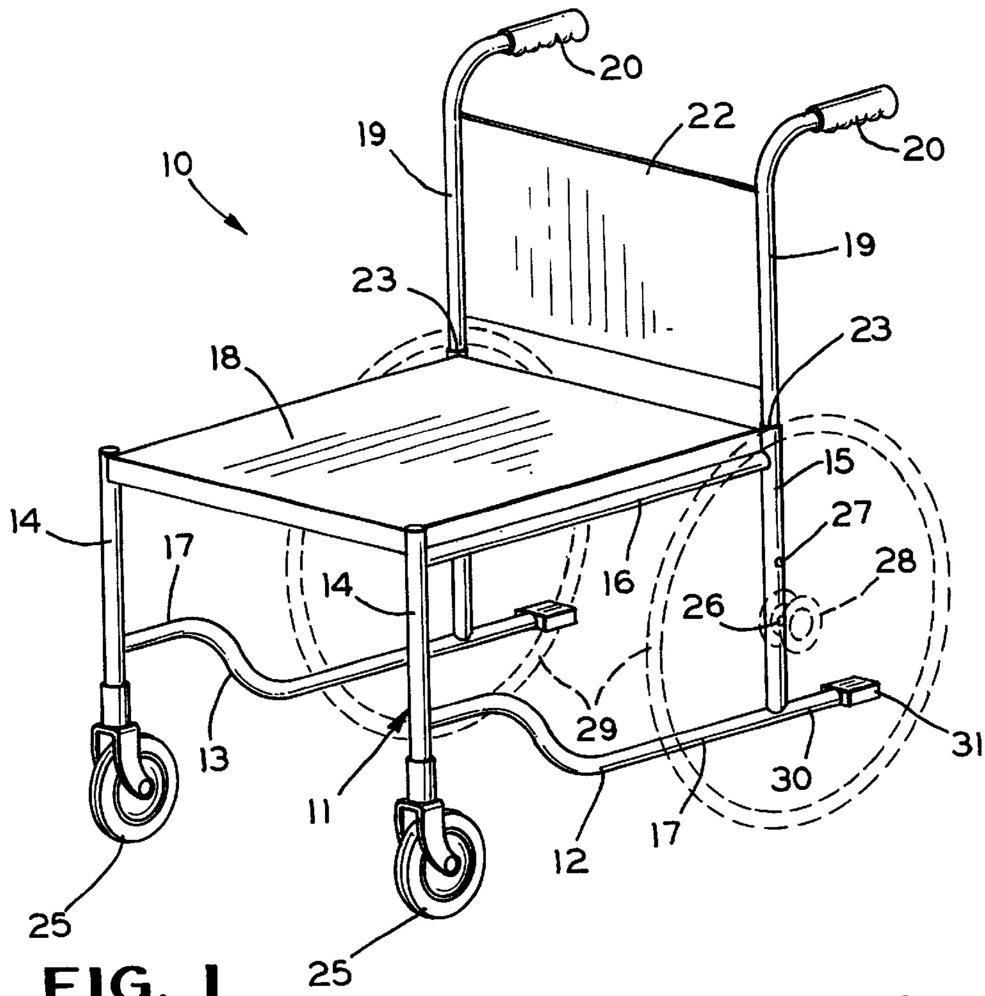
FIG. 1 (PRIOR ART)
FIG. 1 is a fragmentary perspective view of an exemplary conventional prior art wheelchair with a fixed angle seat back, with the rear wheels shown in dashed lines, and with the cross braces for the side frames, arm rests and footrests omitted.
Figure 2:
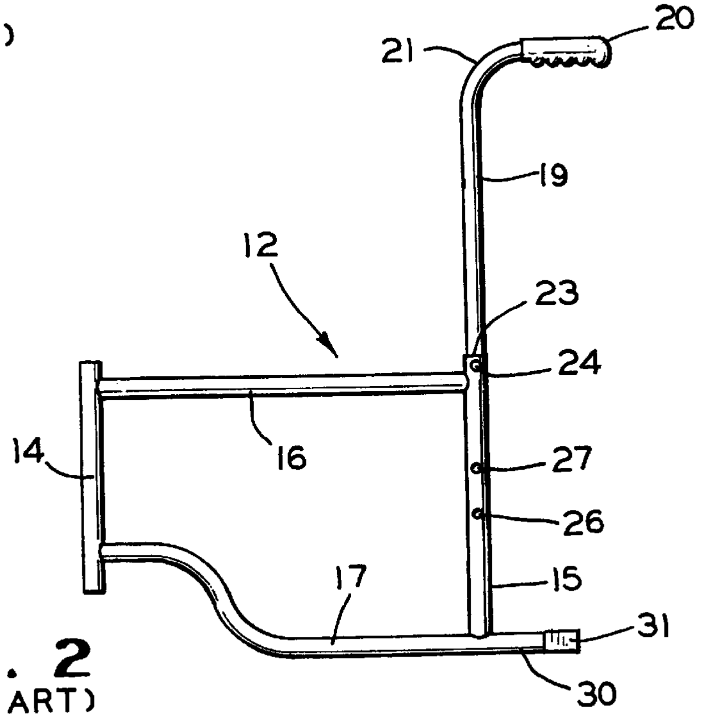
FIG. 2 (PRIOR ART)
FIG. 2 is a side elevational view of a side frame for the wheelchair of FIG. 1.

Referring first to FIGS. 1 and 2 of the drawings, an example of a simplified prior art wheelchair 10 is illustrated. The wheelchair 10 has a frame assembly 11 which includes a left side frame 12 and a right side frame 13, as viewed by a person sitting in the wheelchair 10. The side frames 12 and 13 are connected together by conventional cross braces (not shown). The cross braces may be welded to the side frames to form a rigid, non-collapsible frame assembly, or the cross braces may collapse to fold the side frames together for transportation. Both types of cross braces are well known to those skilled in the wheelchair art.

The side frames 12 and 13 are generally rectangular in shape and each includes a generally vertical front member 14, a generally vertical rear member 15, a upper member 16 and a lower member 17. The members 14–17 may be formed, for example, from metal tubes which are welded together to rigidly form each side frame 12 and 13. Alternately, the members 14–17 may be tubes formed from a plastic resin which is reinforced with fibers such as of glass or carbon. The reinforced tubes are bonded together to form the rigid side frames 12 and 13.

A seat 18 is secured to and extends between the upper members 16 of the side frames 12 and 13. A seat back support 19 extends generally vertically from each rear member 15. A handle or grip 20 is secured to a rearwardly directed upper end 21 of each seat back support 19. A seat back 22 extends between the two spaced seat back supports. The seat 18 and the seat back 22 may be as basic as pieces of fabric stretched between the side frames 12 and 13 and between the seat back supports 19. Or, the seat 18 and the seat back 22 may be of other more sophisticated constructions which are well known in the wheelchair art. In the embodiment illustrated in FIGS. 1 and 2, the seat back supports 19 with the handles 20 are detachable from the side frames 12 and 13 at a joint 23 by means of a bolt or a quick release pin 24. However, in many wheelchairs, the seat back supports 19 and handles 20 are an integral part of the side frames 12 and 13.

A separate caster wheel 25 is secured to and extends below the front member 14 of each side frame 12 and 13. Typically, the caster wheels may be secured to maintain the front of the wheelchair at either of two heights off a floor or other supporting surface for the wheelchair 10. Normally, a footrest (not shown) also is attached to the front member 14 of each side frame 12 and 13. Footrests, arm rests and cross braces for the frame assembly 11 have been omitted from the wheelchair 10 illustrated in FIG. 1 for simplicity, since they do not form a part of the present invention and they are well known wheelchair components.

Two rear wheel mounting holes 26 and 27 are illustrated in each rear frame member 15. The mounting hole 26 is located for mounting an axle assembly 28 for a rear wheel 29 (shown in phantom) at a normal height which is frequently used when the wheelchair occupant is either being pushed or when the wheelchair is hand propelled. When the rear wheel axle assembly 28 is secured to the other hole 27, the wheelchair is lowered, for example, by about 2 inches (about 5 cm) to what is referred to as hemi height. This height makes it easier for a hemiplegic to use a good leg and foot to help propel the wheelchair, while the normal height will keep the user's feet above the ground. Although the wheel mounting holes 26 and 27 are shown formed in the rear member 15 of each side frame 12 and 13, it will be appreciated that other known constructions may be used. For example, the side frames for some wheelchair designs include a wheel mounting plate (not shown) having holes in which the rear wheels are secured. The wheel mounting plate may be attached to the rear frame member 15 or between two vertically spaced frame members or in other known configurations. Although two wheel mounting holes 26 and 27 are illustrated, it will be appreciated that only a single wheel mounting location is needed, or that more than two wheel mounting locations may be provided.

As shown in FIG. 1, the lower frame member 17 on each side frame 12 and 13 may have a portion 30 extending behind the rear frame member 15 and terminating at a pedal 31. A person pushing the wheelchair 10 may step on the pedal 31 while pushing down on the handles 20 to lift the caster wheels 25 at the front of the wheelchair 10 over an obstacle such as a curb.

Figure 3:
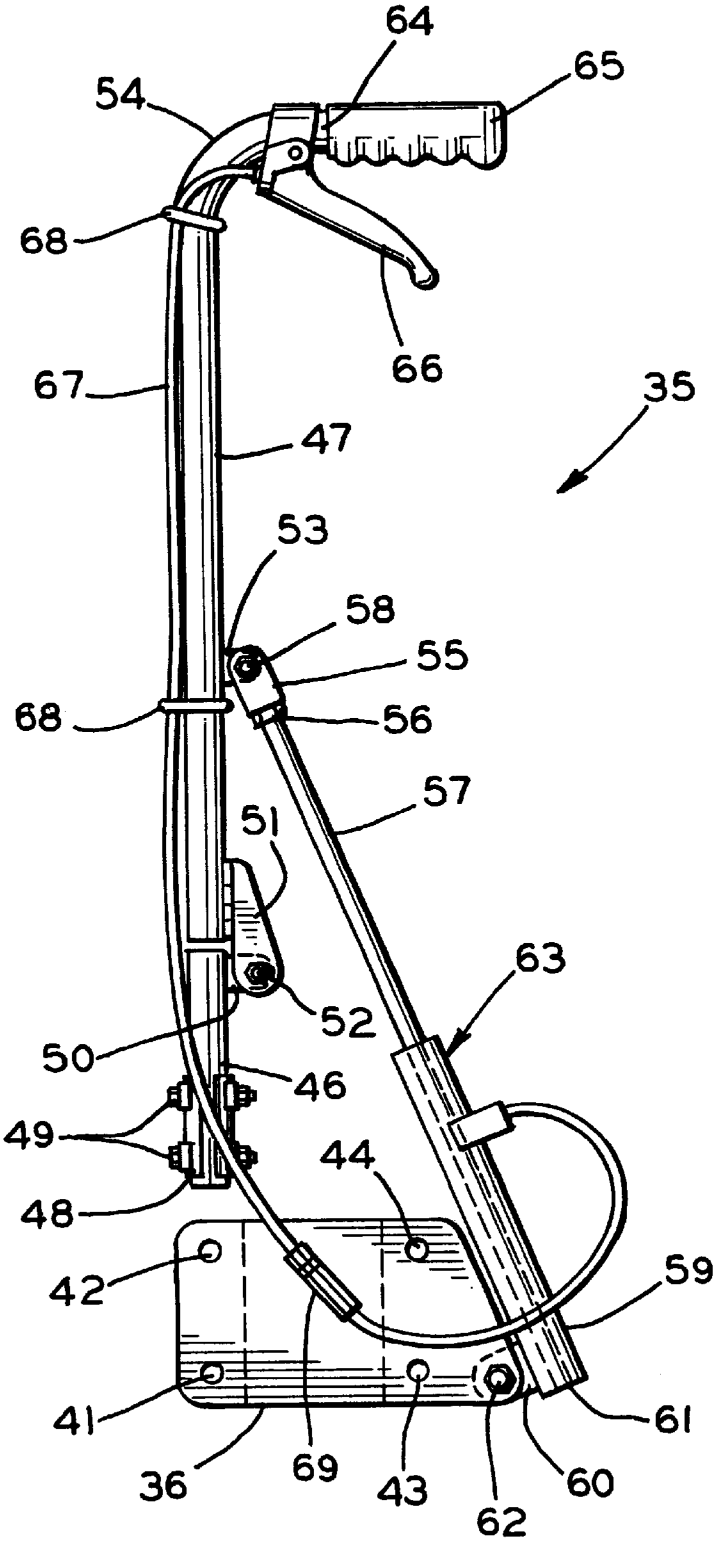
FIG. 3 is a side elevational view of a seat back recliner mechanism for a wheelchair according to the invention.

Referring now to FIG. 3, a seat back recliner mechanism 35 is shown according to the invention. The seat back recliner kit of the invention consists of two of the recliner mechanisms 35, one for mounting on each side of the wheelchair 10.

Figure 4:
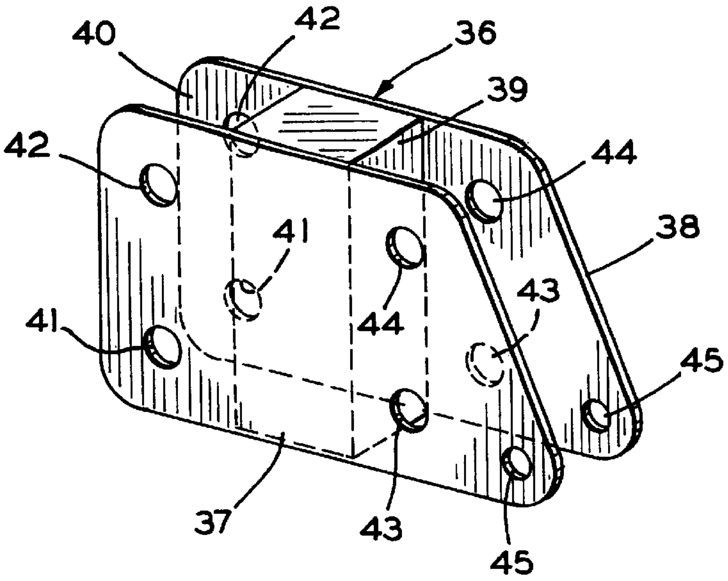
FIG. 4 is a perspective view of the wheel mounting bracket for the wheelchair seat back recliner kit of FIG. 3.

The mechanism 35 includes a rear wheel mounting bracket 36 which is shown in detail in FIGS. 3 and 4. The bracket 36 consists of two parallel plates 37 and 38 which are welded to a spacer block 39. The spacer block 39 spaces the plates apart to define a groove 40 which is sized to receive the rear member 15 of a wheelchair side frame 12 or 13. Alternately, the spacer block 39 may be omitted and ridges or raised portions (not shown) may be formed in one or both of the plates 37 and 38 for welding the plates together with edges spaced to form the groove 40. A pair of lower aligned holes 41 and a pair of upper aligned holes 42 are formed in the two spaced plates 37 and 38. The aligned holes 41 and the aligned holes 42 are spaced to align, respectively, with the holes 26 and 27 when a rear member 15 is positioned in the groove 40. A bolt (not shown) may be inserted through the aligned bracket holes 41 and the rear member hole 26 and another bolt may be inserted through the aligned bracket holes 42 and the rear member hole 27 for securing the bracket 36 to extend to the rear of the wheelchair frame. A lower wheel mounting hole 43 is formed in each of the plates 37 and 38 and an upper wheel mounting hole 44 is formed in each of the plates 37 and 38. An additional hole 45 also is formed in each plate 37 and 38. The function of the holes 45 will be described below.

The holes 43 form a new mounting location for the rear wheel axle assembly 28 for normal wheelchair height and the holes 44 form a new mounting location for the rear wheel axle assembly 28 for hemi height. When the seat back recliner mechanism 35 is attached to a wheelchair and the seat back is reclined, the center of gravity of the occupied wheelchair will move towards the rear of the wheelchair. The rear wheel mounting holes 43 and 44 are located sufficiently to the rear of the wheel mounting holes 26 and 27 to maintain the stability of the occupied wheelchair when the seat back is reclined so that the wheelchair will not tip over backwards. The actual spacing between the holes 26 and 43 and between the holes 27 and 44 may depend on the wheelchair design. In one wheelchair, it was found adequate to space the holes 43 and 44 about 3.25 inches (8.25 cm) to the rear of the holes 26 and 27.

An exemplary construction for the bracket 36 is illustrated for providing wheel mounting holes 43 and 44 to the rear of the wheel mounting holes 26 and 27 in the rear frame member 15. However, it should be appreciated that modified bracket designs may be necessary depending upon the mounting arrangement for attaching the rear wheel axles 28 to the side frames 12 and 13 for different wheelchair designs. Any modifications to the brackets 36 should be in a form which will move the wheel mounting hole or holes to a desired rearward location for maintaining stability when the seat back is reclined and should provide a sufficiently rigid mount for the rear wheels. If the rear wheels are originally mounted sufficiently to the rear of the center of gravity of the occupied wheelchair that a reclined seat back will not present a stability problem, it may not be necessary to move the wheel mounting location.

Referring again to FIG. 3, the recliner mechanism 35 further includes a tubular mounting section 46 to which a seat back support 47 is pivotally secured. A clamp 48 and bolts 49 secure a lower end of the mounting section 46 to the rear member 15 of a side frame 12 or 13. A hinge block 50 is welded to an upper end of the mounting section 46 and a bracket 51 is welded to a lower end of the seat back support 47. A bolt 52 secures the bracket 51 to the hinge block 50 to permit the seat back support 47 to pivot between an upright position, as illustrated, and a reclining position to the rear of a wheelchair to which the recliner mechanism 35 is attached.

A hinge block 53 is welded to the seat back support 47 at a location spaced between the bracket 51 and an upper end 54 of the seat back support 47. A bracket 55 secured to an upper end 56 of a rod 57 is connected by a bolt 58 to pivot on the hinge block 53. The rod 57 passes through a tubular member 59 which includes a releasable locking mechanism, such as a spring which is wound around the rod 57. When the locking mechanism is released, the rod 57 is free to slide in an axial direction in the tubular member 59. When the locking mechanism is engaged, the rod 57 is prevented from sliding in the tubular member 59. A bracket 60 on a lower end 61 of the tubular member 59 is secured with a bolt 62 to the hole 45 in one of the plates 37 or 38 of the rear wheel mounting bracket 36 to permit the tubular member 59 to pivot on the mounting bracket 36. The rod 57 and the tubular member 59 form an adjustable length brace 63 for positioning the seat back support 47. The adjustable brace 63 is known in the art and is a commercially available product and are illustrated in U.S. Pat. Nos. 4,425,987 and 4,457,406. They have been used, for example, for adjusting the angle of automobile seat backs.

The upper end 54 of the seat back support is shown with an end portion 64 curving in a direction which will be towards the rear of a wheelchair to which the seat back recliner mechanism 35 is attached. A grip 65 is mounted on the end portion 64 for grasping by a person who is pushing the wheelchair or who is adjusting the recline angle of the wheelchair seat back. A lever arm 66 is secured to the upper end 54 adjacent the grip 65. The lever arm 66 may be similar to a bicycle hand brake lever and is connected through a cable 67 to operate the locking mechanism in the tubular member 59. The cable 67 may be attached to the seat back support 47, for example, with one or more plastic ties 68. When the lever 66 is squeezed, the cable 67 releases the locking mechanism in the tubular member 59 of the brace 63 to permit the rod 57 to freely slide in an axial direction in the tubular member 59. Consequently, the seat back support 47 may be rotated relative to the mounting section 46 which is attached to the wheelchair frame. If desired, a length adjustment member 69 may be placed at a convenient location in the cable 67 for adjusting the setting of the lever 66 for releasing the locking mechanism in the brace 63. As illustrated, a separate releasing lever 66 is provided for each brace 63. It will be appreciated that a single releasing lever 66 may be connected to simultaneously control the braces 63 on each side of a wheelchair.

Figure 5:
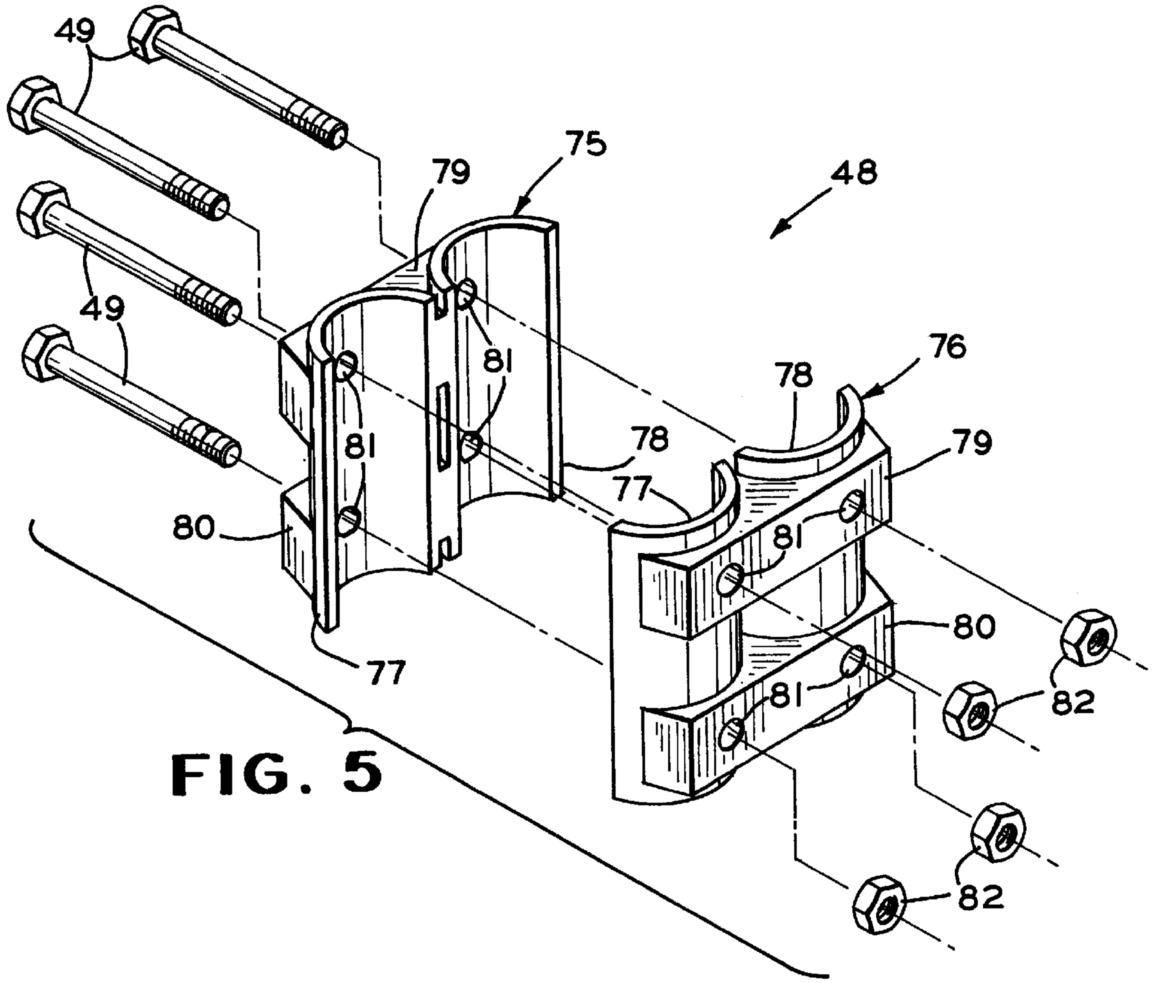
FIG. 5 is an exploded perspective view showing details of a clamp for securing a wheelchair seat back recliner mechanism to a wheelchair side frame.

FIG. 5 shows details of the clamp 48 for attaching each seat back recliner mechanism 35 to a wheelchair side frame 12 or 13. The clamp 48 has first and second halves 75 and 76. Each half 75 and 76 is formed from two semicircular tubular sections 77 and 78. Two spaced members 79 and 80 are welded to the tubular sections 77 and 78 to rigidly connect them together. The two halves 75 and 76 face one another with the tubular sections 77 aligned and the tubular sections 78 aligned. The two opposing tubular sections 77 have an internal curvature which matches the exterior curvature of the mounting section 46 and the two opposing tubular sections 78 have an internal curvature which matches the exterior curvature of the rear members 15 on the wheelchair side frames 12 and 13. Four aligned bolt holes 81 are formed through the members 79 and 80 and the tubular sections 77 and 78 for receiving four bolts 49. The bolts 49 are secured with nuts 82 which are preferably lock nuts.

Figure 6:
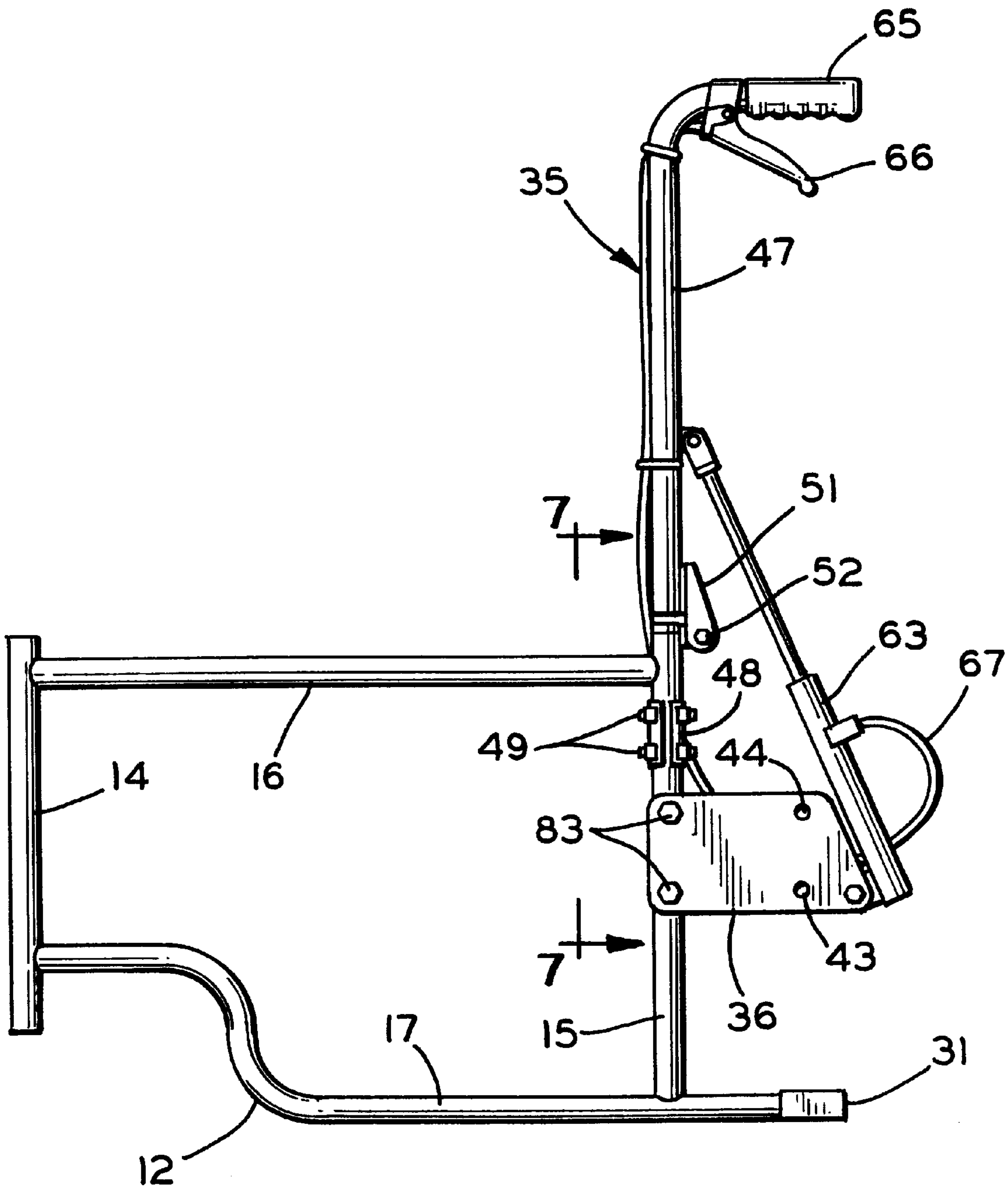
FIG. 6 is a side elevational view of a left side frame for a wheelchair similar to the wheelchair of FIG. 1, with an attached seat back recliner mechanism according to the invention, with the seat back support in an upright position.
Figure 7:
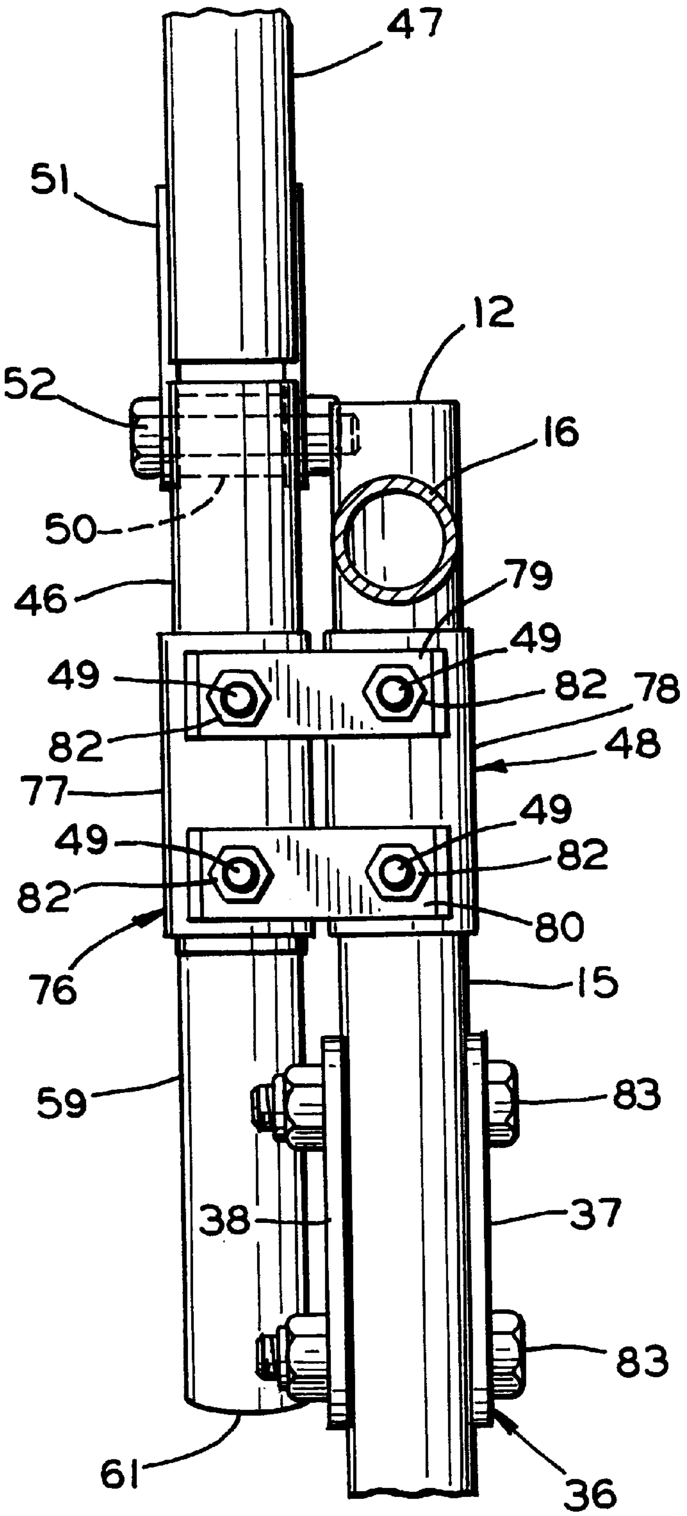
FIG. 7 is an enlarged fragmentary cross sectional view as taken along line 7—7 of FIG. 6.
Figure 8:
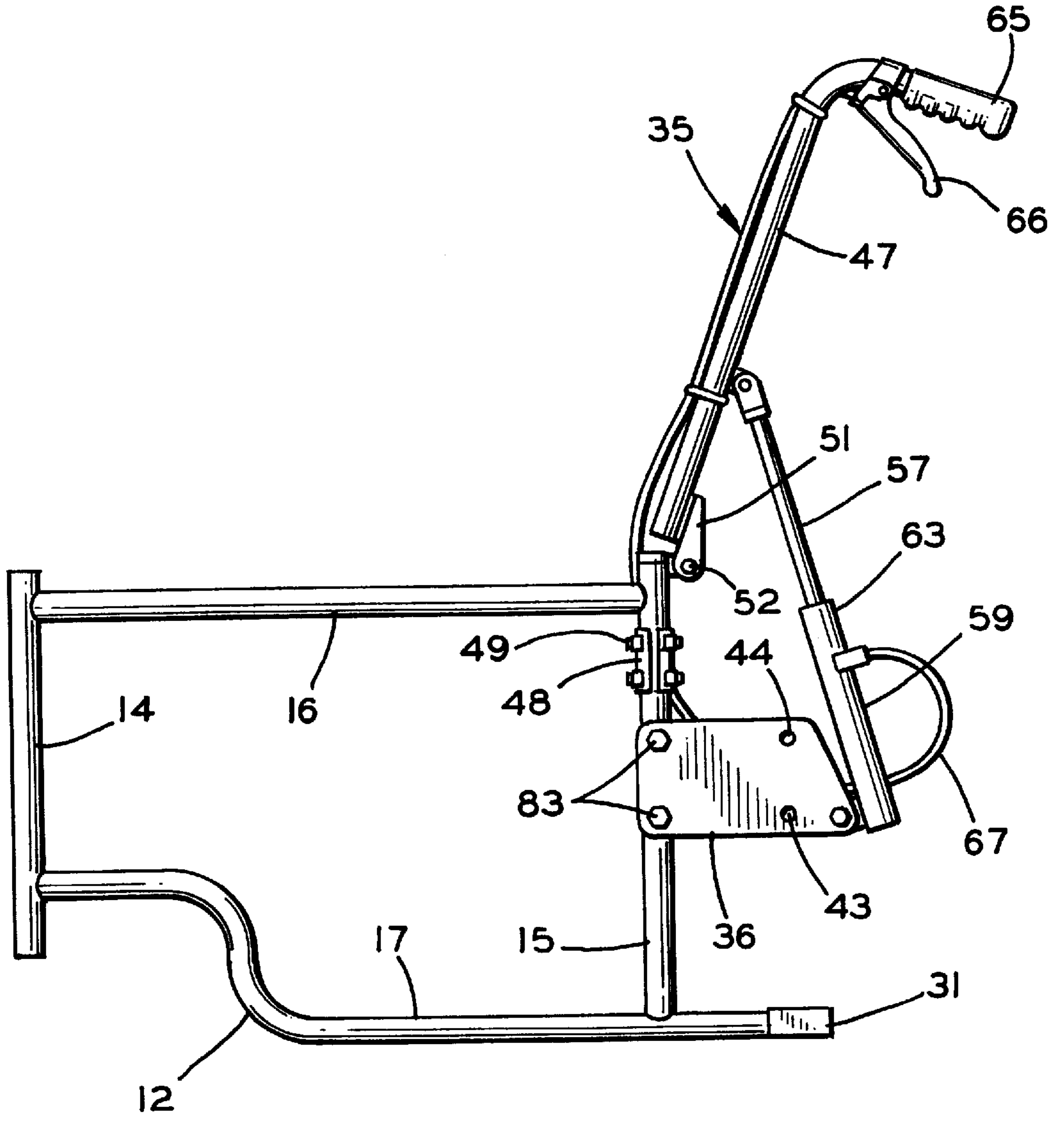
FIG. 8 is a side elevational view, similar to FIG. 6, except with the seat back shown in a partially reclining position.

FIGS. 6–8 show the seat back recliner mechanism 35 secured to the left side frame 12 for the wheelchair 10 of FIG. 1. The wheel mounting bracket 36 is secured to the wheel mounting holes 26 and 27 with bolts 83 so that the bracket 36 extends to the rear of the side frame 12. Two of the bolts 49 pass through the clamp halves 75 and 76 and aligned holes (not shown) in the tubular section 46 of the recliner mechanism 36 and the other two bolts 49 pass through the clamp halves 75 and 76 and aligned holes (not shown) in the rear frame member 15. The bolts 49 are secured with the nuts 82 to rigidly attach the tubular section 46 to the rear member 15 of the side frame 12. Preferably, the recliner mechanism 35 is located to the side of each side frame 12 and 13 facing the other side frame 13 and 12. This prevents the recliner mechanism 35 for extending to the outside of the wheelchair. The tubular member 59 of the adjustable brace 63 is secured to the hole 45 in the plate 37 or 38 on the side of the rear wheel mounting bracket 36 to which the mounting section 46 is located. Also, it is preferable to locate the recliner mechanism 35 so that the bolt 52 about which the seat back support 47 pivots is generally in line with the top of a seat cushion on which the wheelchair user sits. By properly locating the pivot bolt 52 relative to the seat top, a wheelchair occupant will not be pinched when the angle of the seat back is changed. Once a recliner mechanism 35 is attached to each side frame 12 and 13, a conventional wheelchair seat back is mounted between the two spaced seat back supports 47.

FIG. 6 of the drawings shown the recliner mechanism 35 attached to the wheelchair side frame 12, with the seat back support 47 in a vertical position. FIG. 8 is similar to FIG. 6, except that the seat back support 47 is shown in a partially reclining position. I will be noted that the rod 57 in the adjustable brace 63 may extend below the locking tubular member 59 as the seat back support 47 is reclined.

Figure 9:
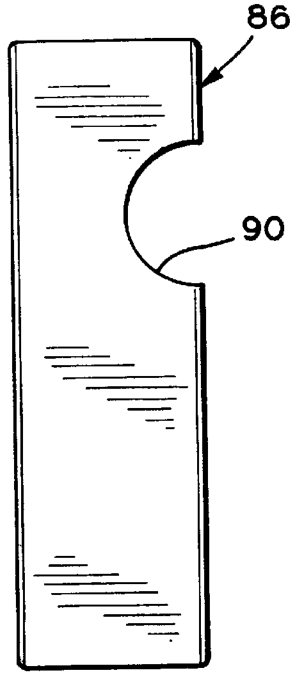
FIG. 9 is a side elevational view of a spacer block for securing a wheelchair seat back recliner mechanism to a wheelchair side frame according to a modified embodiment of the invention.
Figure 10:
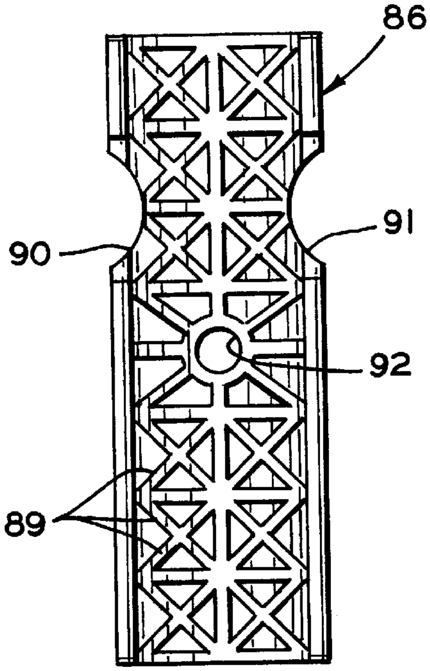
FIG. 10 is a front elevational view of the spacer block of FIG. 9.
Figure 11:
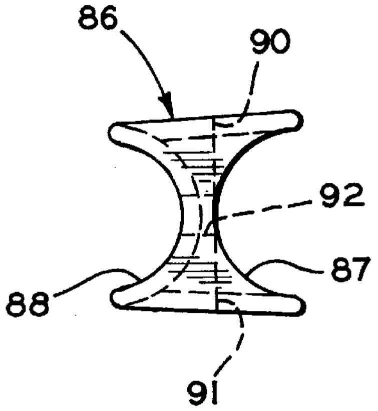
FIG. 11 is a top plan view of the spacer block of FIG. 9.

Turning now to FIGS. 9–11, a spacer block 86 is shown for attaching the tubular mounting section 46 on a seat back recliner mechanism 35 to a wheelchair side frame 12 or 13 according to a modified embodiment of the invention. The spacer block 86 is used as an alternative to the clamp 48. The spacer block 86 may be molded from a plastic material or cast from metal. As best seen in the top plan view of FIG. 11, the spacer block 86 has a longitudinal vertical groove 87 which has a semicircular shape of a size to receive and to closely engage the side of a side frame rear member 15. The spacer block 86 has a second vertical groove 88 which is parallel to the groove 87. The groove 88 also has a semi-circular shape and is of a size or receive and to closely engage the side of the tubular mounting section 46 on the seat back recliner mechanism 35. The spacer block 86 may be solid, or may have a number of ribs 89 forming the groove 87. Notches 90 and 91 may be formed in the block 86 to connect with the groove 87, as needed, to provide relief for the upper side frame member 16. One or more bolt holes 92 are formed through the spacer block 86, as needed, for passing one or more bolts used to secure the tubular mounting section 46 to the rear frame member 15.

Figure 12:
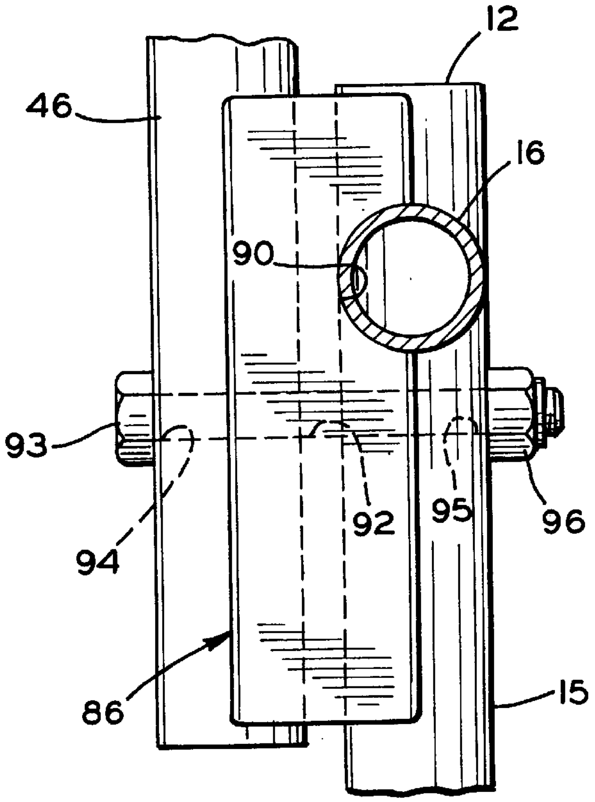
FIG. 12 is a fragmentary cross sectional view showing a wheelchair seat back recliner mechanism attached to a wheelchair side frame with the spacer block of FIG. 9.
Figure 13:
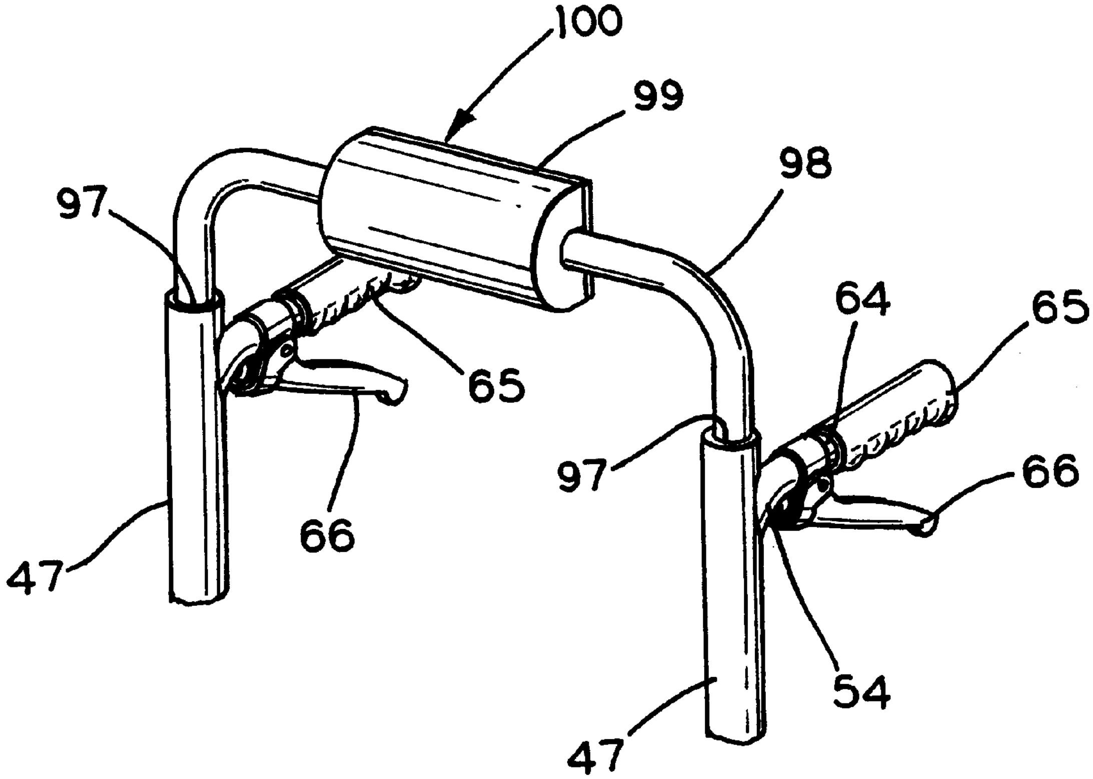
FIG. 13 is a fragmentary perspective view showing a head rest attached to two seat back recliner mechanisms according to a further feature of the invention.

FIG. 12 shows the spacer block 86 used to secure the tubular mounting section 46 to the rear frame member 15. The spacer block 86 is positioned between the tubular mounting section 46 and the rear frame member 15. A bolt 93 is passed through a hole 94 in the tubular mounting section 46, through the hole 92 in the spacer block 86 and through a hole 95 in the rear frame member 46. The bolt 93 is then secured with a nut 96. The nut 96 is preferably of the self locking type. Depending on whether the mounting member 46 is secured to the left side frame 12 or to the right side frame 13, the upper side frame member 16 will pass through one of the notches 90 or 91. It will be appreciated that the design of the spacer block 86 may be readily modified for use with different wheelchair side frame constructions.

As described above, the seat back release lever 66 would normally be located adjacent the grip 65 to facilitate operation by a person who is caring for the user of the wheelchair. In many cases, an occupant of the wheelchair may not be capable of adjusting the seat back angle and will need help. However, it should be appreciated that the seat back recliner kit may be modified to permit an occupant of the wheelchair to adjust the seat back angle. The release lever 66 may be located where it can be operated by the wheelchair occupant. In this case, it would be desirable to place a compression spring (not shown) over the rod 57 or at another suitable location for pushing the seat back support 47 towards a vertical position when the locking mechanism in the adjustable brace 63 is released. The wheelchair occupant will lean back to push the seat back to a desired angle while operating the lever 66, and release the lever 66 to lock the seat back in the set position. It also will be appreciated that the braces 63 may be replaced with power operated braces which extend or retract upon operation of a control.

As a further modification to the seat back recliner kit, the seat back support 47 for each recliner mechanism 35 has an upper opening 97 adjacent the upper end 54 and before the handle end portion 64. An optional head rest is provided for telescopically insertion into the openings of two recliner mechanisms 35 on a wheelchair. The head rest is positioned to support the head of a person seated in the wheelchair when the seat back supports 47 are reclined towards a horizontal position. The head rest may consist of a fabric web stretched between two extension tubes inserted into the openings in the seat back supports 47. Preferable, a detachable spreader bar is provided between either the extensions or the upper portion of the seat back support to stabilize the seat back supports 47 when a user rests against the head rest. The spreader bar is detachable to facilitate folding the wheelchair for transportation. Alternately, the head rest 100 may include a U-shaped tube 98 which inserts into the spaced openings 97 between two seat back supports 47 when two recliner mechanisms are mounted on a wheelchair. A head rest pad 99 is secured to the U-shaped tube 98. The head rest 100 may be removed from the seat back supports 47 when folding the wheelchair, or the U-shaped tube 98 may be hinged to collapse not shown.

It will be appreciated that various modifications and changes may be made to the above described preferred embodiment of a seat back recliner kit for a wheelchair without departing from the scope of the following claims. For example, in the illustrated wheelchair 10, the seat back supports 19 were removable from the side frames 12 and 13. In many wheelchairs, the seat back supports are an integral portion of the side frames. In this case, either the original seat back supports may be cut off of the side frames prior to attaching the recliner mechanisms 35, or the recliner mechanisms 35 may be mounted to the inside of the existing seat back supports. The handles on the seat back supports 47 may then be eliminated or provided with a more simple handle to be used only when adjusting the seat back angle. The levers 66 may then be attached to the original seat back supports next to the existing handles on the side frames. The braces 63 and hinges 50 may be replaced with rotary clutches or similar locking pivots which can be released to adjust the seat back angle and then locked at the desired angle.

What is claimed is:

1. A seat back recliner kit adapted to attach to a wheelchair having left and right rear wheels, and a frame having left and right sides with at least one wheel mount on each of said left and right sides, said kit including two seat back recliner mechanisms, each of said seat back recliner mechanisms including a rear wheel mounting bracket adapted to be secured the wheelchair frame, said rear wheel mounting bracket having at least one rear wheel mount located a predetermined distance to the rear of a rear wheel mount on a wheelchair frame when said rear wheel mounting bracket is secured to a wheelchair frame, and an adjustable angle seat back support adapted to be secured to the wheelchair frame.

2. A seat back recliner kit adapted to attach to a wheelchair, as set forth in claim 1, wherein said rear wheel mounting bracket for each seat back recliner mechanism is adapted to bolt to a plurality of vertically spaced rear wheel mounts on a side of the wheelchair frame, and wherein said rear wheel mounting bracket for each seat back recliner mechanism has at least two vertically spaced rear wheel mounts located a predetermined distance to the rear of each of the plurality of vertically spaced rear wheel mounts on a side of a wheelchair frame when said rear wheel mounting bracket is bolted to a wheelchair frame.

3. A seat back recliner kit adapted to attach to a wheelchair, as set forth in claim 2, and wherein each seat back recliner mechanism includes a mounting section adapted to be secured to the wheelchair frame, wherein each seat back support is pivotally attached to a mounting section, and a releasable locking mechanism setting a reclining angle between each seat back support and the pivotally attached mounting section.

4. A seat back recliner kit adapted to attach to a wheelchair, as set forth in claim 3, and wherein for each seat back recliner mechanism said releasable locking mechanism includes an adjustable length brace extending between the seat back support and the rear wheel mounting bracket.

5. A seat back recliner kit adapted to attach to a wheelchair, as set forth in claim 4, and wherein the adjustable length brace for each seat back recliner mechanism includes a releasable lock which when engaged maintains the length of the adjustable length brace and when disengaged the length of the adjustable length brace may be changed.

6. A seat back recliner kit adapted to attach to a wheelchair, as set forth in claim 5, and wherein each seat back recliner mechanism includes a releasing lever for operating said releasable lock in the adjustable length brace in the seat back recliner mechanism.

7. A seat back recliner kit adapted to attach to a wheelchair, as set forth in claim 1, and wherein rear wheel mounting bracket for each of said recliner mechanisms has a groove sized to receive a rear member of a wheelchair side frame, a plurality of holes in said rear wheel mounting bracket spaced to align with a plurality of rear wheel mounting holes on the rear member of the wheelchair side frame, whereby bolts may be passed through holes in said rear wheel mounting bracket and aligned holes in the rear member of the wheelchair to secure said rear wheel mounting bracket to the wheelchair side frame.

8. A seat back recliner kit adapted to attach to a wheelchair, as set forth in claim 1, wherein each adjustable seat back support has an upper end, and further including a head rest adapted to connect to the upper ends of the seat back supports on said two recliner mechanisms in said kit.

9. For a wheelchair having a pair of front wheels, a pair of rear wheels, and a frame with left and right sides with at least one rear wheel mounting hole on each of said left and right sides, apparatus for increasing the stability of the wheelchair including a bracket having a front portion with at least one attachment hole adapted to bolt to said at least one rear wheel mounting hole on a side of the wheelchair frame, said bracket having a rear portion adapted to extend to the rear of the wheelchair frame when said bracket is bolted to at least one rear wheel mounting hole on a side of the wheelchair frame, and wherein said rear portion of said bracket has at least one rear wheel mounting hole spaced a predetermined distance from said attachment hole.

10. Apparatus for increasing the stability of a wheelchair, as set forth in claim 9, and wherein said front portion of said bracket has two vertically spaced attachment holes adapted to bolt to two vertically spaced rear wheel mounting holes on a side of the wheelchair frame.

11. Apparatus for increasing the stability of a wheelchair, as set forth in claim 10, and wherein said rear portion of said bracket has two vertically spaced rear wheel mounting holes, and wherein said rear wheel mounting holes on said rear portion of said bracket have the same vertical spacing as said two vertically spaced attachment holes.

12. Apparatus for increasing the stability of a wheelchair, as set forth in claim 11, and wherein said front portion of said bracket includes two spaced plates forming a vertical groove adapted to receive a portion of a side of the wheelchair frame having the two vertically spaced rear wheel mounting holes, and wherein upper attachment holes are formed in each of said plates to align with an upper one of the vertically spaced rear wheel mounting holes on a frame side and lower attachment holes are formed in each of said plates to align with a lower one of the vertically spaced rear wheel mounting holes on a frame side when the portion of the frame side is positioned in said vertical groove.

13. A seat back recliner kit adapted to be attached to a wheelchair having left and right rear wheels, and a frame having left and right sides, each of said sides having at least one rear wheel mounting hole, said seat back recliner kit including at least two seat back recliner mechanisms each including a mounting section adapted to be secured to a side of the wheelchair frame, a seat back support pivotally attached to said mounting section, a releasable locking mechanism setting a reclining angle between said seat back support and the pivotally attached mounting section, wherein said mounting section on each seat back recliner mechanism includes at least one rear wheel mounting hole, and wherein said at least one rear wheel mounting hole on the mounting section for each seat back recliner mechanism is located to be to the rear of the at least one rear wheel mounting hole in a wheelchair side frame to which such seat back recliner mechanism is mounted.

14. A seat back recliner kit adapted to be attached to a wheelchair, as set forth in claim 13, and wherein said releasable locking mechanism includes an adjustable length brace having an end pivotally connected to said seat back support, said brace having a releasable lock which when engaged maintains the length of said adjustable length brace and when disengaged allows adjustment of the length of said adjustable length brace.

15. A seat back recliner kit adapted to be attached to a wheelchair, as set forth in claim 14, and wherein said releasable locking mechanism further includes a release lever mounted on said seat back support connected for operating the releasable lock in the adjustable length brace.

16. A seat back recliner kit adapted to attach to a wheelchair, as set forth in claim 13, wherein each adjustable seat back support has an upper end, and further including a head rest adapted to connect to the upper ends of the seat back supports on said two recliner mechanisms in said kit.

* * * * *